(12) United States Patent
Nataraja et al.

(10) Patent No.: US 10,142,264 B2
(45) Date of Patent: Nov. 27, 2018

(54) TECHNIQUES FOR INTEGRATION OF BLADE SWITCHES WITH PROGRAMMABLE FABRIC

(71) Applicant: CISCO TECHNOLOGY, INC., San Jose, CA (US)

(72) Inventors: Rajesh Babu Nataraja, Sunnyvale, CA (US); Shyam Kapadia, San Jose, CA (US); Lei Fu, Palo Alto, CA (US); Nilesh Shah, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 131 days.

(21) Appl. No.: 15/224,158

(22) Filed: Jul. 29, 2016

(65) Prior Publication Data

US 2018/0034747 A1    Feb. 1, 2018

(51) Int. Cl.
*H04L 12/46*    (2006.01)
*H04L 12/931*   (2013.01)
*H04L 12/24*    (2006.01)

(52) U.S. Cl.
CPC .......... *H04L 49/70* (2013.01); *H04L 12/4641* (2013.01); *H04L 41/0803* (2013.01)

(58) Field of Classification Search
CPC ......... H04L 12/00; H04L 12/28; H04L 12/46; H04L 12/56; H04L 12/709; H04L 12/713; H04L 12/741; H04L 12/803; H04L 12/933; H04L 45/74; G06F 15/173
See application file for complete search history.

(56) References Cited

U.S. PATENT DOCUMENTS

| | | | |
|---|---|---|---|
| 9,369,407 B2 * | 6/2016 | Brar | H04L 49/15 |
| 9,497,039 B2 * | 11/2016 | Greenberg | H04L 12/4633 |
| 2011/0317703 A1 * | 12/2011 | Dunbar | H04L 12/462 370/392 |
| 2015/0010002 A1 * | 1/2015 | Duda | H04L 45/74 370/392 |
| 2015/0271010 A1 | 9/2015 | Shetty et al. | |
| 2015/0317169 A1 | 11/2015 | Sinha et al. | |
| 2016/0103696 A1 | 4/2016 | Nataraja et al. | |
| 2017/0034053 A1 * | 2/2017 | Chanda | H04L 45/586 |

* cited by examiner

*Primary Examiner* — Mohamed A Kamara
(74) *Attorney, Agent, or Firm* — Polsinelli PC (57) ABSTRACT

A method is described and in one embodiment includes receiving at a top-of-rack ("TOR") switch a notification concerning a virtual machine ("VM"), wherein the received notification identifies a host associated with the VM; determining whether the identified host is directly connected to the TOR switch; and if the identified host is not directly connected to the TOR switch, identifying an intermediate switch to which the identified host is directly connected; and determining whether the identified intermediate switch to which the identified host is directly attached is attached to the TOR switch.

20 Claims, 6 Drawing Sheets

TECHNIQUES FOR INTEGRATION OF BLADE SWITCHES WITH PROGRAMMABLE FABRIC

TECHNICAL FIELD

This disclosure relates in general to the field of communications networks and, more particularly, to techniques for integrating blade switches with programmable fabric.

BACKGROUND

Typical data center deployments have multiple rows, with each row including multiple racks and each rack including a large number of servers. In order to pack more compute power into a single rack, blade server-based deployments have become very popular. A blade switch can manage multiple blade server chassis connected thereto. Each blade server chassis can accommodate some number of physical servers inserted into the chassis in a line card fashion. Cisco Systems, Inc.'s Unified Computing System with Fabric Interconnect ("UCS-FI") represents one example of such a data center deployment. Cisco's VM Tracker feature provides an elegant solution for automating configuration of a Top-of-Rack ("ToR") switch based on virtual machine ("VM") coming up notifications from a VM manager, which may be implemented using VMware's vCenter. VM Tracker is similar to Arista's VM Tracer feature, but has the added benefit of synchronization across a pair of ToR switches, as well as allowing Virtual Local Area Network ("VLAN"), Virtual Routing and Forwarding element ("VRF"), Switch Virtual Interface ("SVI"), and Border Gateway Protocol-based Ethernet Virtual Private Network ("BGP-EVPN") configuration to be autoprovisioned on the ToR. In contrast, Arista VM tracer supports only VLAN and trunk port configuration.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is described and in one embodiment includes receiving at a top-of-rack ("TOR") switch a notification concerning a virtual machine ("VM"), wherein the received notification identifies a host associated with the VM; determining whether the identified host is directly connected to the TOR switch; and, if the identified host is not directly connected to the TOR switch, identifying an intermediate switch to which the identified host is directly connected and determining whether the identified intermediate switch to which the identified host is directly attached is attached to the TOR switch. In some embodiments, the method further includes, if the identified intermediate switch to which the identified host is not directly attached to the TOR switch, ignoring the notification, and, if the identified intermediate switch to which the identified host is directly attached to the TOR switch, configuring the VM network on the TOR switch.

In certain embodiments the method further includes, if the identified intermediate switch to which the identified host is directly attached to the TOR switch, taking actions proscribed by the notification with respect to the VM. The notification may be received from a VM manager, in which case the identifying an intermediate switch to which the identified host is directly connected may include referring to an entry of a database of the VM manager corresponding to the identified host to identify the intermediate switch to which the identified host is directly connected. Additionally, the determining whether the identified intermediate switch to which the identified host is directly attached is attached to the TOR switch may include referring to Link Layer Discovery Protocol ("LLDP") information in a Management Information Base ("MIB") table of the TOR switch to determine whether the identified intermediate switch is directly attached to the TOR switch.

The identified intermediate switch may include at least one of a blade switch, a UCS mini switch, and an L2 switch and the notification may include at least one of an instruction to add the VM on the identified host and an instruction to remove the VM from the identified host.

Example Embodiments

Both VM Tracer and VM Tracker require that virtualized servers be directly connected to the ToR switch, since Link Layer Discovery Protocol/Cisco Discovery Protocol ("LLDP/CDP") for determining which server is connected behind which ToR switch is used in conjunction with vCenter notifications to determine whether a given ToR switch should act on the notification. This situation breaks down if there is an intermediate switch connected between the ToR and the virtualized servers, which is the case for all blade switch-based deployments.

Given the popularity of blade chassis deployments in data centers today, embodiments herein comprise an elegant solution for supporting autoprovisioning of ToR switches for blade servers in the same manner as currently available for directly attached virtualized servers. The embodiments described herein help solve the VM tracker auto-provisioning by deploying a two-hop resolution of VM connectivity and ultimately provisioning the networks for VMs behind the blade automatically.

The growing popularity of server virtualization technologies has added to network configuration requirements. For example, VMs executing on the same physical server may belong to different Layer 2 ("L2") domains and may require a switching device to provision multiple VLANs on the ports that connect to the physical servers. To provide seamless movement of VMs from one physical server to another, the servers must be reachable through the same Layer 2 domain so that the VMs can retain their IP addresses and network connectivity even after moving. A static predefined configuration requires provisioning of all possible VLANs that can be used by VMs in a server management domain on each port of the switch. This process can result in more logical port-based VLANs than the switch can support. Alternatively, VLANs may be dynamically provisioned on an L2 Ethernet or L2 port-channel interface of the switch based on tracking of the VMs that are connected to the port and the VLAN requirements of these VMs. VM Tracker enables the identification of the switch device port that is used for each VM, as well as the VLAN requirements of each VM. VM Tracker further enables tracking movement of VMs from one host (which in certain embodiments is implemented as an ESXi host) to another, tracking VM configuration changes (additions, deletions, or modifications of VLANs) and configuration of VLANs on the switching device ports accordingly, tracking additions or deletions of VMs and hosts and configuring VLANs on switching device ports accordingly, and tracking an on/off state of the VMs and configuring VLANs on local switching device ports only for VMs in the on state.

Figure 1:
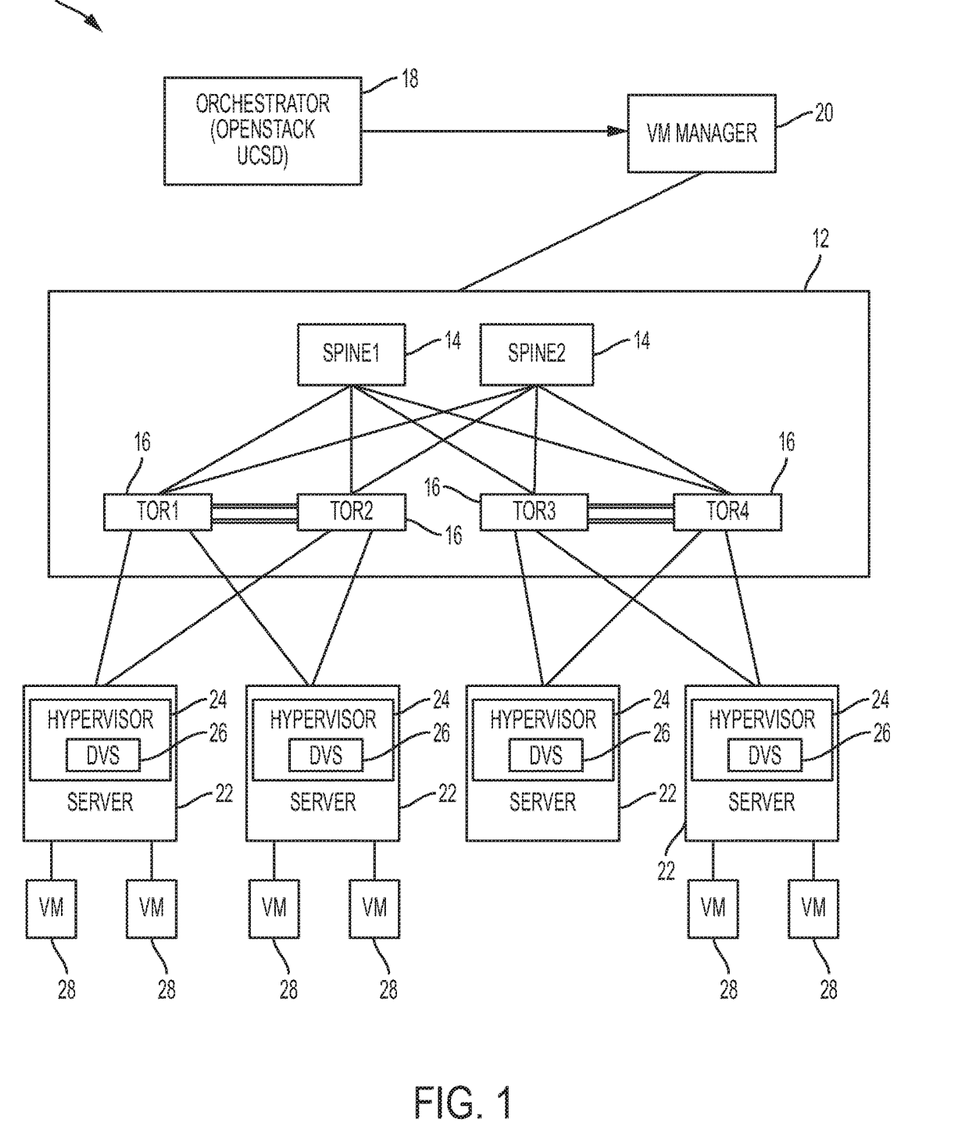
FIG. 1 is a simplified block diagram of a data center network in which VM Tracker or its equivalent may be employed for implementing a programmable fabric in accordance with embodiments described herein.

FIG. 1 is a simplified block diagram of a data center network 10 in which VM Tracker or its equivalent may be employed for implementing a programmable fabric in accordance with embodiments described herein. As shown in FIG. 1, the network 10 includes a data center fabric 12 including spine switches 14 interconnected with leaf, or TOR, switches 16. As shown in FIG. 1, an orchestrator 18 is provided for interfacing with a VM manager 20 for providing VM management, as will be described. Each of a plurality of hosts, or servers, 22, is connected to one or more of the TOR switches 16. Several of the servers 22 include a hypervisor 24, each of which may include a Distributed Virtual Switch ("DVS") 26, for facilitating operations associated with the hosting of one or more VMs 28. In certain embodiments, VM manager 20 may be implemented as VMware vCenter and each of the TOR switches 16 may have installed thereon a VM tracking functionality (such as VM Tracker) for providing functionality in accordance with the details provided below.

In particular, in certain embodiments, the VM tracking functionality installed on the TOR switches 16 connects with the VM manager 20 and collects information about the VMs 28 running on the hosts 22. The collected information may include, for each host, the number of VMs that are running on the host and, for each VM, the switching device through which the VM receives network traffic. Assuming the VM tracking functionality is implemented as VM Tracker, once VM Tracker is enabled on a TOR switch, it automatically extracts the following information about each VM from the VM manager 20 (e.g., vCenter):

the host on which the VM exists;
the switching device port(s) through which the VM traffic flows;
the Virtual Network Interface Card ("vNIC") that connects the VM to a virtual switch;
the power state of the VM;
the VLAN information of group ports or Distributed Virtual Switch ("DVS") port groups; and
the port groups or DVS port groups that are required for the VM.

VM Tracker is trigger-implemented on the TOR switches such that a TOR switch receives a notification from the VM Manager and thereby has access to a variety of VM/DVS information. In a normal VM Tracker auto-provisioning implementation, a TOR switch accesses database of the VM Manager to identify a directly attached virtualized server connected to one of its ports. The VM Manager database contains LLDP/CDP information as sent by the TOR switch towards a hypervisor (e.g., VMware ESXi) on a virtualized bare metal blade server. The VM Manager sends out notifications over a messaging bus on which the TOR switch is listening. Upon receipt of a VM creation notification, the TOR switch matches up its server connections to the server name received in the VM creation or deletion request to determine whether the VM that is the subject of the notification is hosted on a directly connected server, or host. If so, the requisite action is taken by the TOR switch; otherwise, the notification may be ignored. This task is very simple when a server is directly connected to the TOR switch, in which case the TOR switch merely needs to match the LLDP information in the VM Manager database for that server with its own local LLDP system information.

Figure 2:
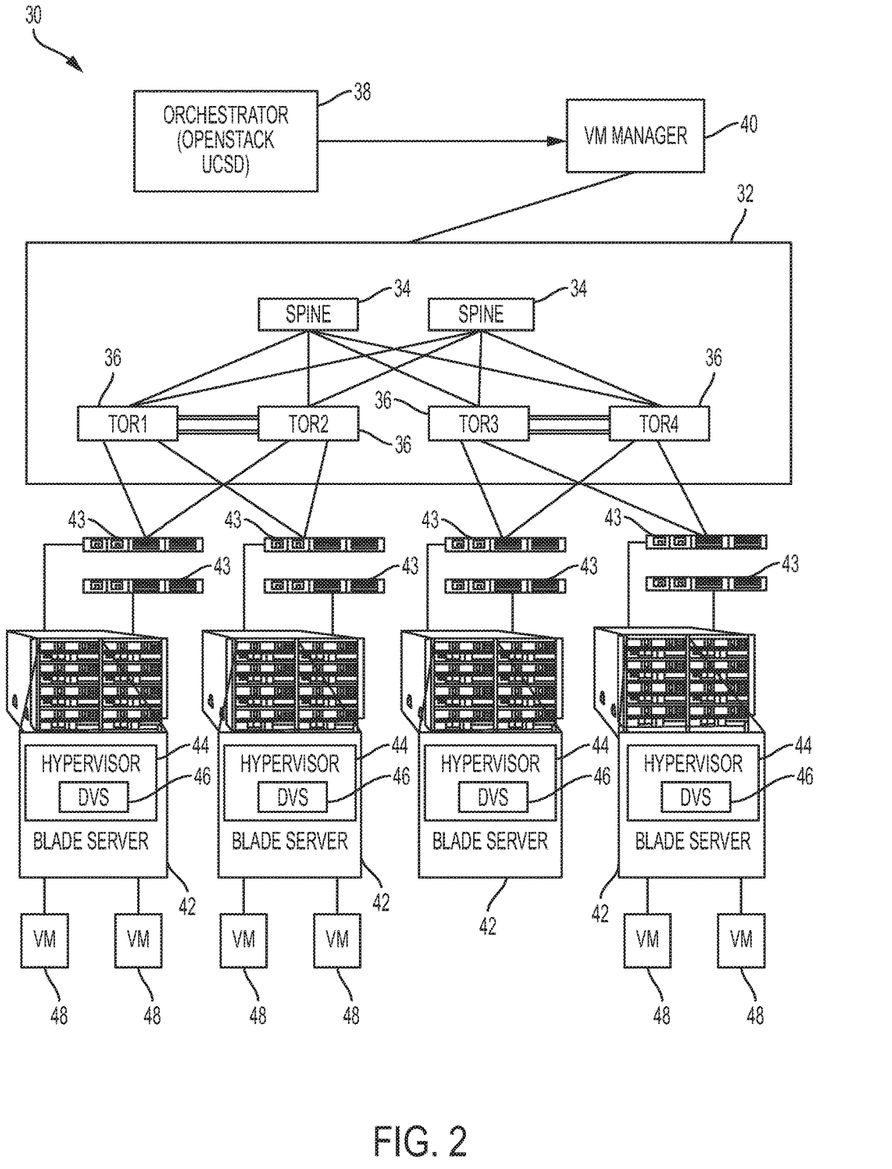
FIG. 2 is a simplified block diagram of a data center network in which VM Tracker or its equivalent may be employed for implementing a programmable fabric in which blade servers are connected to top-of-rack ("TOR") switches via fabric interconnects in accordance with embodiments described herein.

In contrast, when there is a blade switch disposed between the TOR switch and the hosts, the above-described logic breaks, as the blade switch consumes the LLDP packets sent by the TOR. This situation is illustrated in FIG. 2, which is a simplified block diagram of a data center network 30 in which VM Tracker or its equivalent may be employed for implementing a programmable fabric in accordance with embodiments described herein. As shown in FIG. 2, similar to the network 10, the network 30 includes a data center fabric 32 including spine switches 34 interconnected with leaf, or TOR, switches 36, as well as an orchestrator 38 that interfaces with a VM manager 40, the functions of which were described in connection with FIG. 1. In the embodiment depicted in FIG. 2, each of a plurality of hosts, or blade servers, 42, which in the illustrated embodiment comprise blade servers disposed in a rack, are connected to one or more of the TOR switches 36 via fabric interconnects, which may also be referred to herein as blade switches, 43. Fabric interconnects/blade switches 43 may be implemented as Cisco UCS 6x00 series fabric interconnects. Several of the blade servers 42 include a hypervisor 44 that may include a DVS 46 for facilitating operations associated with the hosting of one or more VMs 48. As with the VM manager 20, in certain embodiments, VM manager 40 may be implemented using VMware vCenter and each of the TOR switches 36 may have installed thereon a VM tracking functionality (such as VM Tracker) for providing functionality in accordance with the details provided hereinbelow.

As previously noted, VM tracking functionality installed on the TOR switches connects with the VM Manager (e.g., VMware vCenter) and collects information about the VMs running on the hosts connected to the fabric. The collected information may include, for each host, the number of VMs that are running the host and, for each VM, the switching device through which the VM receives network traffic.

Figure 3:
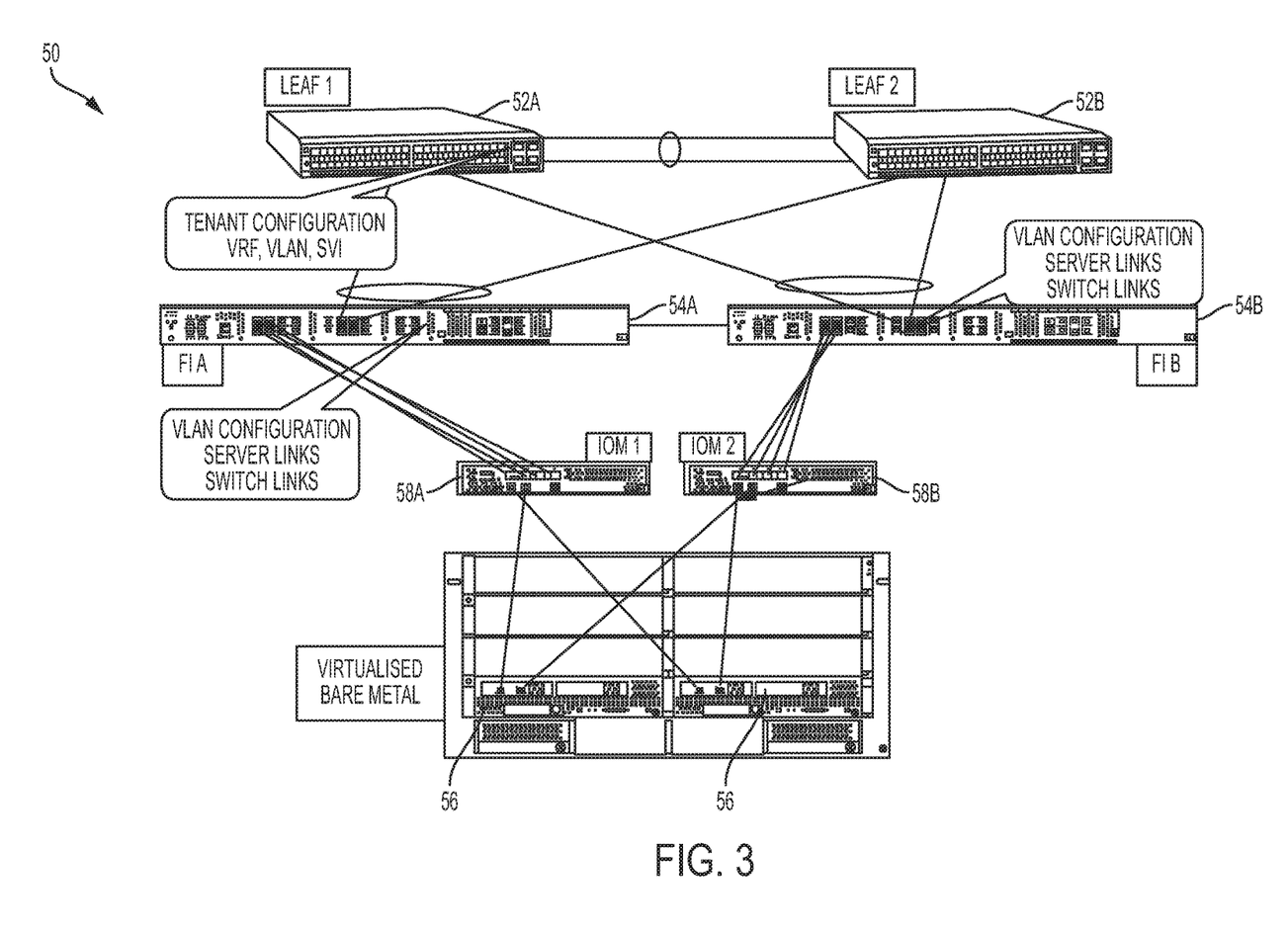
FIG. 3 is a more simplified block diagram of a portion of a data center network in which VM Tracker or its equivalent may be employed for implementing a programmable fabric in which blade servers are connected to TOR switches via fabric interconnects in accordance with embodiments described herein.

FIG. 3 is a more simplified block diagram of a portion of a data center network, designated in FIG. 3 by a reference numeral 50, in which in which VM Tracker or its equivalent may be employed for implementing a programmable fabric in accordance with embodiments described herein. As shown in FIG. 3, the network portion 50 includes two leaf, or TOR, switches 52A, 52B, on which VM Tracker may be deployed for facilitating tenant configuration, including VRF, VLAN, and SVI information for tenants. The TOR switches 52A, 52B are connected to fabric interconnects, or blade switches, 54A, 54B, which connect the TOR switches to a plurality of blade servers 56, which may be implemented as virtualized bare metal servers, via I/O modules, or fabric extenders, 58A, 58B. Blade switches 54A, 54B, maintain VLAN configuration (e.g., server links, switch links) for servers connected thereto.

As previously noted, disposition of a blade switch between the TOR switch and the hosts, as depicted in FIGS. 2 and 3, results in the blade switch consuming the LLDP packets sent by the TOR such that the TOR cannot identify what servers lie beyond the blade switch. Embodiments described herein solve this issue using a two hop identification process. Upon receipt of a VM notification (e.g., a VM creation or deletion message) from the VM Manager, the TOR switch first refers to a database of the VM Manager to determine whether the server identified in the VM notification is connected to a blade switch or a switch via the existing mechanism ("server<->blade-switch mapping"). If it is determined that the identified server is connected to a blade switch, the TOR learns from the local LLDP information it retains in a local Management Information Database ("MIB") what blade switches are directly attached to it ("TOR<->blade-switch mapping"). Correlating the information learned from step 1, the TOR switch is able to determine which servers are located below it. This in turn alerts the TOR switch that any information about VMs coming up ("creation") or going down ("deletion") on the identified server should be acted upon by the TOR switch. The TOR switch then triggers auto-provisioning required for those VMs. This two-hop resolution in VM Tracker helps automatically provision tenants whose VMs are deployed on blade servers behind a blade switch. The same procedure may be employed for auto-provisioning TORs when VMs are deployed in a mini UCS chassis. Additionally, the procedure described herein may be employed for auto-provisioning TORs when a normal L2 switch is disposed between the TOR and the hosts. In general, in accordance with features of embodiments described herein, the TOR's LLDP MIB is mapped to the VM Manager's database to compare the LLDP information and determine whether a host is connected using the two-hop mechanism. This is true regardless of whether there is a blade switch, a UCS mini switch, or an L2 switch disposed between the TOR and the host.

Figure 4:
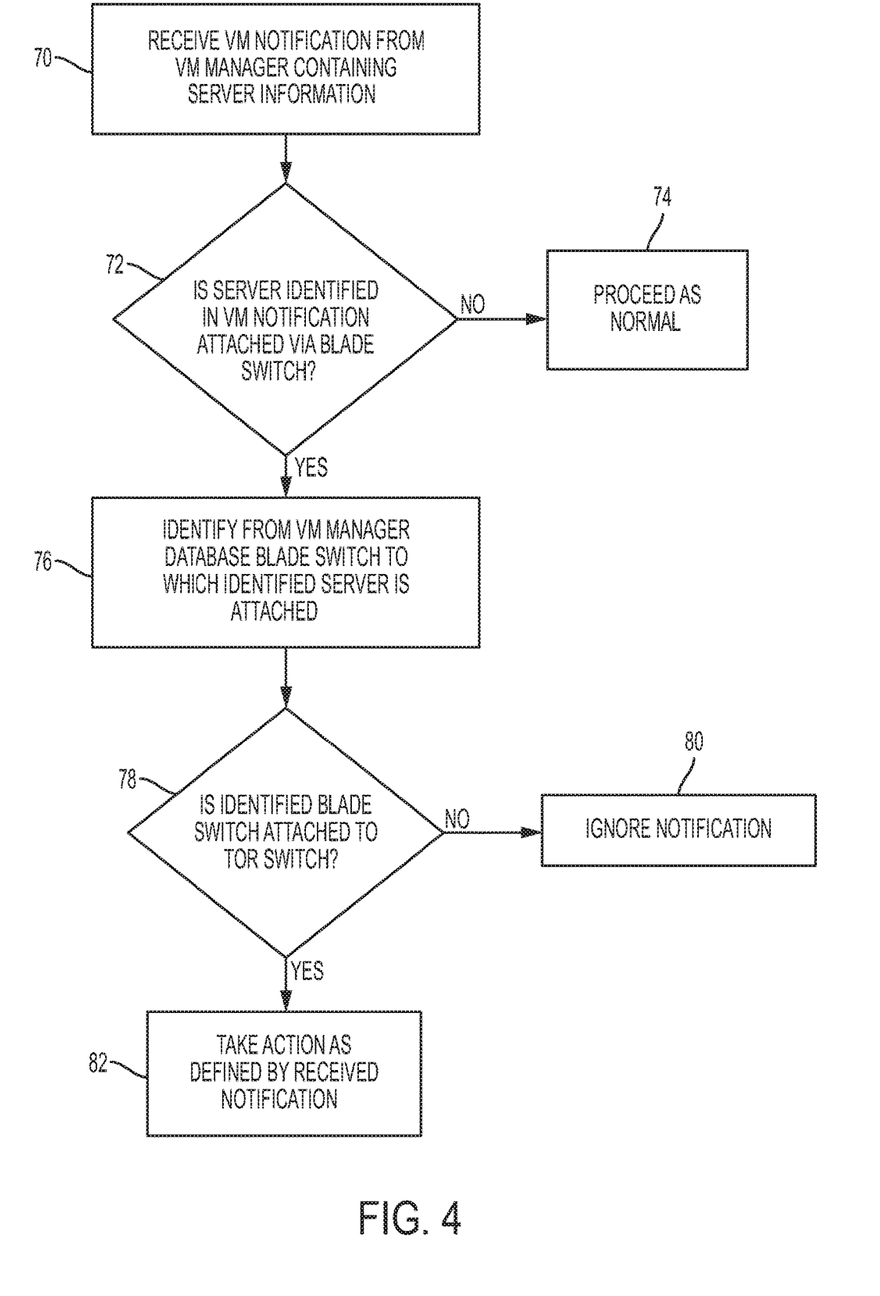
FIG. 4 is a flowchart illustrating steps of a method that may be implemented by a TOR switch in accordance with embodiments described herein for techniques for successful integration of blade switches with programmable fabric.

FIG. 4 is a flowchart illustrating steps of a method that may be implemented by a TOR switch in accordance with embodiments described herein for techniques for successful integration of blade switches with programmable fabric. Referring to FIG. 4, in step 70, a VM notification is detected or received by the TOR switch from the VM Manager. As previously noted, the VM notification may be a VM creation or VM deletion notification. The notification identifies a server on which the VM is to be created or from which the VM is to be deleted. In step 72, a determination is made whether the server identified in the VM notification is connected via a blade switch. If not, meaning that the server is directly connected to the TOR switch, execution proceeds to step 74 in which the process proceeds as normal. If it is determined in step 72 that the server identified in the VM notification is connected via a blade switch, execution proceeds to step 76, in which a determination is made with reference to the VM manager database the blade switch to which the server is attached. In step 78, a determination is made whether the blade switch identified in step 76 is attached to the TOR switch. This step may be implemented with reference to an MIB table of the TOR switch indicating what blade switches are directly attached to it ("TOR<->blade-switch mapping"). If it is determined in step 78 that the identified blade switch is not attached to the TOR switch, execution proceeds to step 80, in which the notification is ignored. However, if it is determined in step 78 that the identified blade switch is attached to the TOR switch, execution proceeds to step 82, in which the VM is configured on the TOR switch and the action as defined by the received notification is taken by the TOR switch.

In example implementations, at least some portions of the activities related to the techniques described herein may be implemented in software in, for example, a server, a router, etc. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

Figure 5:
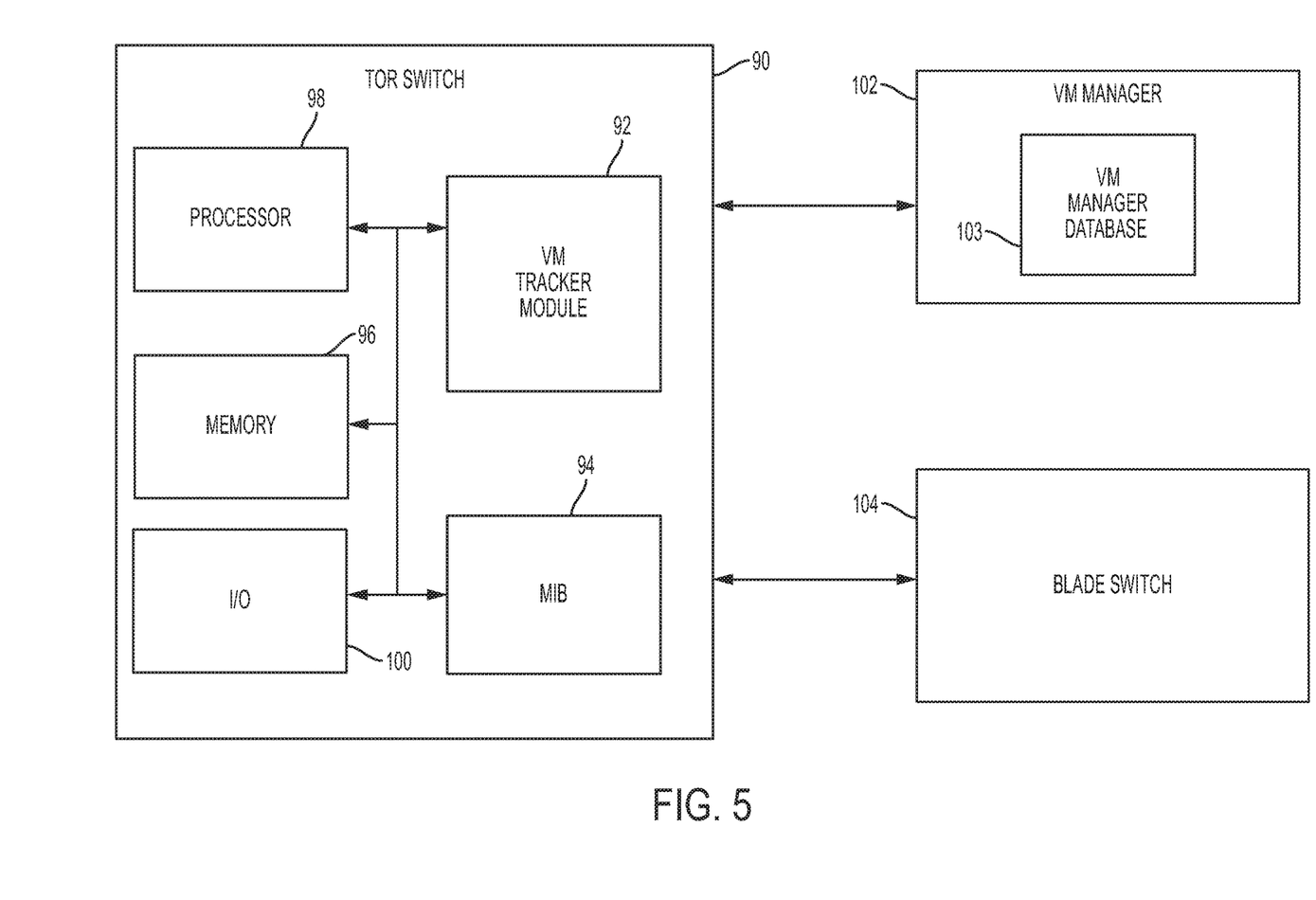
FIG. 5 is a simplified block diagram of a network node comprising a TOR switch configured in accordance with embodiments described herein for techniques for successful integration of blade switches with programmable fabric.

For example, referring to FIG. 5, a network node, or element, 90, which may be implemented as a TOR switch, may include a VM Tracker module 92 comprising software embodied in one or more tangible media for facilitating the activities described herein. In particular, the VM Tracker module 92 may comprise software for facilitating the processes illustrated in and described with reference to FIG. 5 in combination with data stored in an MIB 94. The node 90 may also include a memory device 96 for storing information to be used in achieving the functions as outlined herein. Additionally, the node 90 may include a processor 98 that is capable of executing software or an algorithm (such as embodied in module 92) to perform the functions as discussed in this Specification. The node 90 may also include various I/O 100 necessary for performing functions described herein. As described with reference to FIG. 2, the node 90 is functionally connected to a network manager element 102, which may be implemented as VM vCenter and may include a VM Manager Database 103, and to one or more blade switches, or fabric interconnects, 104, which may be implemented as Cisco 6x00 series fabric interconnects.

It will be recognized that the node 90 of FIG. 5 may be implemented using one or more computer devices comprising software embodied in one or more tangible media for facilitating the activities described herein. The computer device for implementing the transmitter and receiver elements may also include a memory device (or memory element) for storing information to be used in achieving the functions as outlined herein. Additionally, the computer device for implementing the transmitter and receiver elements may include a processor that is capable of executing software or an algorithm to perform the functions as discussed in this Specification, including but not limited to the functions illustrated in and described with reference to FIG. 4. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 6:
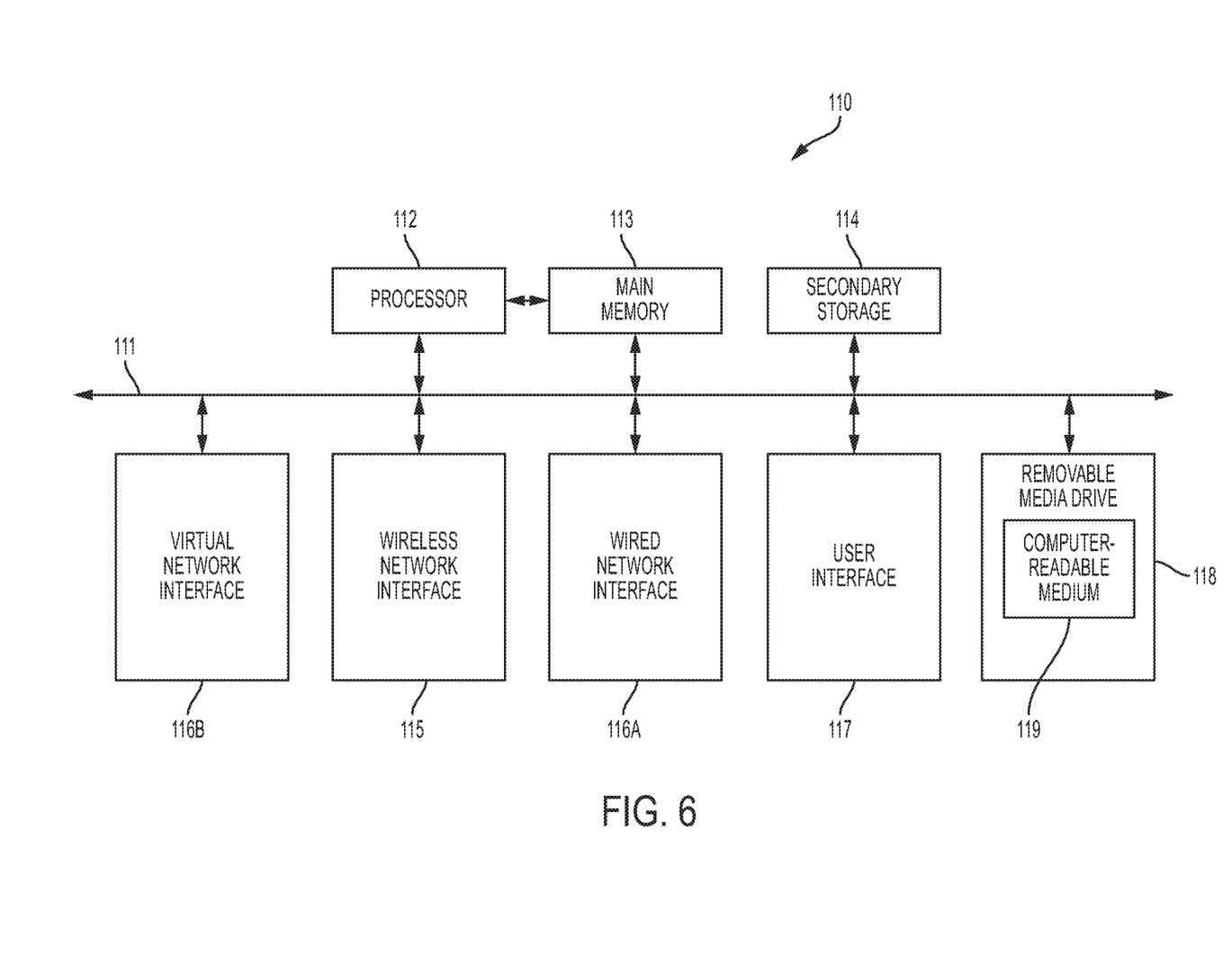
FIG. 6 is a simplified block diagram of a machine comprising an element of a communications network in which techniques for successful integration of blade switches with programmable fabric in accordance with embodiments described herein may be implemented.

Turning to FIG. 6, FIG. 6 illustrates a simplified block diagram of an example machine (or apparatus) 130, which in certain embodiments may be a classifier or a forwarding element, that may be implemented in embodiments described herein. The example machine 130 corresponds to network elements and computing devices that may be deployed in a communications network, such as a classifier or a forwarding element. In particular, FIG. 6 illustrates a block diagram representation of an example form of a machine within which software and hardware cause machine 130 to perform any one or more of the activities or operations discussed herein. As shown in FIG. 6, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 6 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

In one example implementation, classifier and forwarding elements, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM"), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Certain embodiments described herein separate the overlay in service function chaining into an infrastructure overlay and a service function overlay, allowing additional security policies to be enforced between the two. Certain embodiments described herein provide a stateless, hardware friendly method for decrementing the NSH service index without requiring any state at the forwarding element or sender awareness. Additionally, certain embodiments described herein restrict the forwarding decisions (in updating the service index) to the forwarding elements alone and frees the service functions to focus purely on service delivery and avoid dealing with complexities associated with forwarding decisions. Still further, certain embodiments described herein enable the service chaining control plane to scale independently of the number of service functions and prevent issues that may arise due to incorrect manipulation of the service index by limiting manipulation of the service index to forwarding elements.

Certain embodiments described herein allow snooping tools or any type of intermediate nodes to clearly determine whether the NSH encapsulated packet is going between forwarding elements or between a forwarding element and a service function without relying on the source and destination locators, which is useful in tracing and debugging, especially in cloud deployments. Certain embodiments described herein allow the service index on an NSH packet to be always associated with the service function as indicated by the service index whether the packet is in transit from a forwarding element to the service function or from the service function to a forwarding element.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving at a top-of-rack ("TOR") switch a notification concerning a virtual machine ("VM"), wherein the received notification identifies a host associated with the VM;
   determining whether the identified host is directly connected to the TOR switch; and
   if the identified host is not directly connected to the TOR switch:
      identifying an intermediate switch to which the identified host is directly connected; and
      determining whether the identified intermediate switch to which the identified host is directly attached is attached to the TOR switch.

2. The method of claim 1 further comprising, if the identified intermediate switch to which the identified host is not directly attached to the TOR switch, ignoring the notification.

3. The method of claim 1 further comprising, if the identified intermediate switch to which the identified host is directly attached to the TOR switch, configuring the VM network on the TOR switch.

4. The method of claim 1 further comprising, if the identified intermediate switch to which the identified host is directly attached to the TOR switch, taking actions proscribed by the notification with respect to the VM.

5. The method of claim 1, wherein the notification is received from a VM manager and the identifying an intermediate switch to which the identified host is directly connected comprises:
   referring to an entry of a database of the VM manager corresponding to the identified host to identify the intermediate switch to which the identified host is directly connected.

6. The method of claim 5, wherein the determining whether the identified intermediate switch to which the identified host is directly attached is attached to the TOR switch comprises:
   referring to Link Layer Discovery Protocol ("LLDP") information in a Management Information Base ("MIB") table of the TOR switch to determine whether the identified intermediate switch is directly attached to the TOR switch.

7. The method of claim 1, wherein the identified intermediate switch comprises at least one of a blade switch, a UCS mini switch, and an L2 switch.

8. The method of claim 1, wherein the notification comprises one of an instruction to add the VM on the identified host and an instruction to remove the VM from the identified host.

9. Non-transitory tangible media that includes code for execution and when executed by a processor is operable to perform operations comprising:
- receiving at a top-of-rack ("TOR") switch a notification concerning a virtual machine ("VM"), wherein the received notification identifies a host associated with the VM;
- determining whether the identified host is directly connected to the TOR switch; and
- if the identified host is not directly connected to the TOR switch:
  - identifying an intermediate switch to which the identified host is directly connected; and
  - determining whether the identified intermediate switch to which the identified host is directly attached is attached to the TOR switch.

10. The media of claim 9, wherein the operations further comprise, if the identified intermediate switch to which the identified host is not directly attached to the TOR switch, ignoring the notification.

11. The media of claim 9, wherein the operations further comprise, if the identified intermediate switch to which the identified host is directly attached to the TOR switch, configuring the VM network on the TOR switch.

12. The media of claim 9, wherein the operations further comprise, if the identified intermediate switch to which the identified host is directly attached to the TOR switch, taking actions proscribed by the notification with respect to the VM.

13. The media of claim 9, wherein the notification is received from a VM manager and the identifying an intermediate switch to which the identified host is directly connected comprises:
- referring to an entry of a database of the VM manager corresponding to the identified host to identify the intermediate switch to which the identified host is directly connected.

14. The media of claim 13, wherein the determining whether the identified intermediate switch to which the identified host is directly attached is attached to the TOR switch comprises:
- referring to Link Layer Discovery Protocol ("LLDP") information in a Management Information Base ("MIB") table of the TOR switch to determine whether the identified intermediate switch is directly attached to the TOR switch.

15. An apparatus comprising:
- a memory element configured to store data;
- a processor operable to execute instructions associated with the data; and
- a Virtual Machine ("VM") tracker module configured to:
  - receive at a top-of-rack ("TOR") switch a notification concerning a VM, wherein the received notification identifies a host associated with the VM;
  - determine whether the identified host is directly connected to the TOR switch; and
  - if the identified host is not directly connected to the TOR switch:
    - identify an intermediate switch to which the identified host is directly connected; and
    - determine whether the identified intermediate switch to which the identified host is directly attached is attached to the TOR switch.

16. The apparatus of claim 15, wherein the VM tracker module is further configured to, if the identified intermediate switch to which the identified host is not directly attached to the TOR switch, ignore the notification.

17. The apparatus of claim 15, wherein the VM tracker module is further configured to, if the identified intermediate switch to which the identified host is directly attached to the TOR switch, configure the VM on the TOR switch.

18. The apparatus of claim 15, wherein the VM tracker module is further configured to, if the identified intermediate switch to which the identified host is directly attached to the TOR switch, take actions proscribed by the notification with respect to the VM.

19. The apparatus of claim 15, wherein the notification is received from a VM manager and the identifying an intermediate switch to which the identified host is directly connected comprises:
- referring to an entry of a database of the VM manager corresponding to the identified host to identify the intermediate switch to which the identified host is directly connected.

20. The apparatus of claim 19, wherein the determining whether the identified intermediate switch to which the identified host is directly attached is attached to the TOR switch comprises:
- referring to Link Layer Discovery Protocol ("LLDP") information in a Management Information Base ("MIB") table of the TOR switch to determine whether the identified intermediate switch is directly attached to the TOR switch.

* * * * *